(12) United States Patent
Finlay et al.

(10) Patent No.: US 11,544,881 B1
(45) Date of Patent: Jan. 3, 2023

(54) METHOD AND DATA PROCESSING SYSTEM FOR LOSSY IMAGE OR VIDEO ENCODING, TRANSMISSION AND DECODING

(71) Applicant: DEEP RENDER LTD, London (GB)

(72) Inventors: Chris Finlay, London (GB); Jonathan Rayner, London (GB); Chri Besenbruch, London (GB); Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 17/748,468

(22) Filed: May 19, 2022

(30) Foreign Application Priority Data

Aug. 3, 2021 (GB) ........................................ 2111188

(51) Int. Cl.
| | |
|---|---|
| *G06K 9/46* | (2006.01) |
| *G06T 9/00* | (2006.01) |
| *G06N 3/08* | (2006.01) |
| *G06N 3/04* | (2006.01) |
| *G06T 3/40* | (2006.01) |

(52) U.S. Cl.
CPC ........... *G06T 9/002* (2013.01); *G06N 3/0454* (2013.01); *G06N 3/08* (2013.01); *G06T 3/4046* (2013.01)

(58) Field of Classification Search
CPC ..... G06T 9/002; G06T 3/4046; G06N 3/0454; G06N 3/08
USPC ......................................................... 382/232
See application file for complete search history.

(56) References Cited

U.S. PATENT DOCUMENTS

| | | | |
|---|---|---|---|
| 2020/0193552 A1* | 6/2020 | Turkelson | G06V 10/454 |
| 2021/0004589 A1* | 1/2021 | Turkelson | G06V 10/82 |
| 2022/0084255 A1* | 3/2022 | Minnen | G06N 3/088 |

OTHER PUBLICATIONS

Glasser, I., et al., Expressive power of tensor-network factorizations for probabilistic modeling with applications from hidden markov models to quantum machine learning. arXiv preprint arXiv:1907.03741, 2019.

\* cited by examiner

*Primary Examiner* — Charlotte M Baker
(74) *Attorney, Agent, or Firm* — Saul Ewing LLP

(57) ABSTRACT

A method for lossy image or video encoding, transmission and decoding, the method comprising the steps of: receiving an input image at a first computer system; encoding the first input training image using a first trained neural network to produce a latent representation; performing a quantization process on the latent representation to produce a quantized latent; entropy encoding the quantized latent using a probability distribution, wherein the probability distribution is defined using a tensor network; transmitting the entropy encoded quantized latent to a second computer system; entropy decoding the entropy encoded quantized latent using the probability distribution to retrieve the quantized latent; and decoding the quantized latent using a second trained neural network to produce an output image, wherein the output image is an approximation of the input training image.

16 Claims, 10 Drawing Sheets

Figure 1:
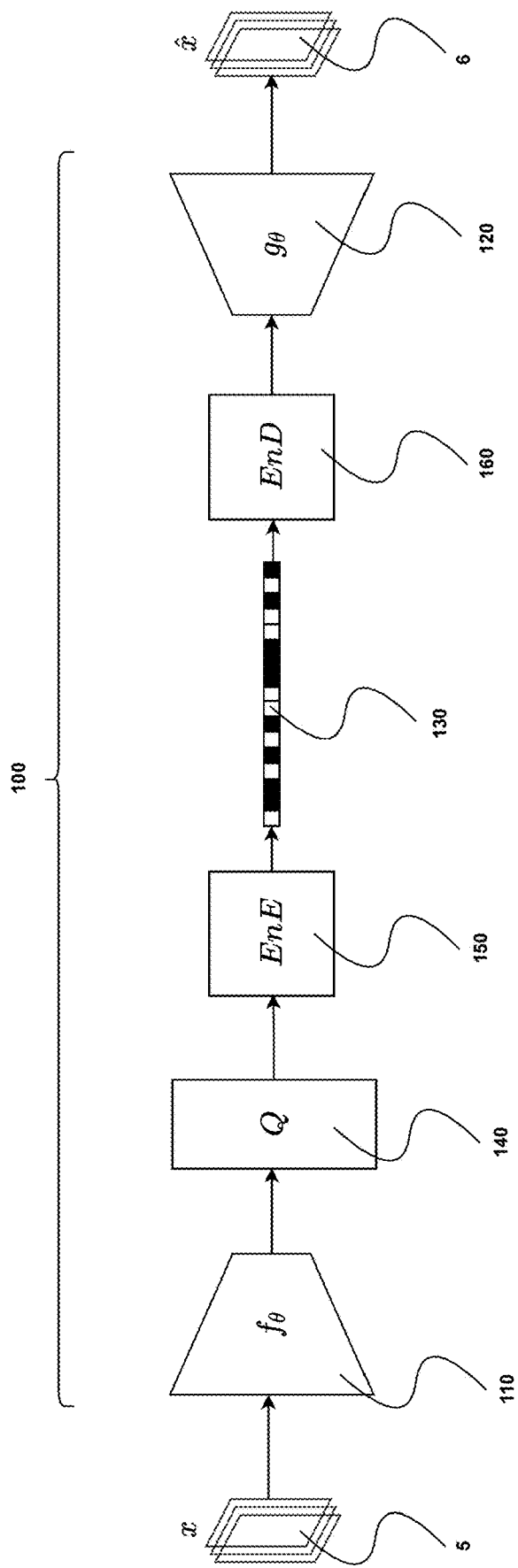

METHOD AND DATA PROCESSING SYSTEM FOR LOSSY IMAGE OR VIDEO ENCODING, TRANSMISSION AND DECODING

CROSS-REFERENCE TO RELATED APPLICATIONS

This application is based on, and claims priority to GB Application No. GB 2111188.5, filed on Aug. 3, 2021, the entire contents of which being fully incorporated herein by reference.

FIELD OF THE INVENTION

This invention relates to a method for lossy image or video encoding, transmission and decoding, a method of training one or more networks, and data processing system configured to perform the method for lossy image or video encoding, transmission and decoding.

There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted.

To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimise the apparent loss of information by the removal of information that results in changes to the decompressed image or video that is not particularly noticeable to the human visual system. Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results in terms of the appearance of the compressed image or video or the amount of information required to be transmitted.

According to the present invention there is provided a method for lossy image or video encoding, transmission and decoding, the method comprising the steps of: receiving an input image at a first computer system; encoding the first input training image using a first trained neural network to produce a latent representation; performing a quantization process on the latent representation to produce a quantized latent; entropy encoding the quantized latent using a probability distribution, wherein the probability distribution is defined using a tensor network; transmitting the entropy encoded quantized latent to a second computer system; entropy decoding the entropy encoded quantized latent using the probability distribution to retrieve the quantized latent; and decoding the quantized latent using a second trained neural network to produce an output image, wherein the output image is an approximation of the input training image.

The probability distribution may be defined by a Hermitian operator operating on the quantized latent, wherein the Hermitian operator is defined by the tensor network.

The tensor network may comprise a non-orthonormal core tensor and one or more orthonormal tensors.

The method may further comprise the steps of: encoding the latent representation using a third trained neural network to produce a hyper-latent representation; performing a quantization process on the hyper-latent representation to produce a quantized hyper-latent; transmitting the quantized hyper-latent to the second computer system; and decoding the quantized hyper-latent using a fourth trained neural network; wherein the output of the fourth trained neural network is one or more parameters of the tensor network.

The tensor network may comprise a non-orthonormal core tensor and one or more orthonormal tensors; and the output of the fourth trained neural network may be one or more parameters of the non-orthonormal core tensor.

One or more parameters of the tensor network may be calculated using one or more pixels of the latent representation.

The probability distribution may be associated with a sub-set of the pixels of the latent representation.

The probability distribution may be associated with a channel of the latent representation.

The tensor network may be at least one of the following factorisations: Tensor Tree, Locally Purified State, Born Machine, Matrix Product State and Projected Entangled Pair State.

According to the present invention there is provided a method of training one or more networks, the one or more networks being for use in lossy image or video encoding, transmission and decoding, the method comprising the steps of: receiving a first input training image; encoding the first input training image using a first neural network to produce a latent representation; performing a quantization process on the latent representation to produce a quantized latent; entropy encoding the quantized latent using a probability distribution, wherein the probability distribution is defined using a tensor network; entropy decoding the entropy encoded quantized latent using the probability distribution to retrieve the quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network.

One or more of the parameters of the tensor network may be additionally updated based on back-propogation of the loss function.

The tensor network may comprise a non-orthonormal core tensor and one or more orthonormal tensors; and the parameters of all of the tensors of the tensor network except for the non-orthonormal core tensor may be updated based on back-propogation of the loss function.

The tensor network may be calculated using the latent representation.

The tensor network may be calculated based on a linear interpolation of the latent representation. The loss function may further comprise a term based on the entropy of the tensor network.

According to the present invention there is provided a data processing system configured to perform the method for lossy image or video encoding, transmission and decoding.

Aspects of the invention will now be described by way of examples, with reference to the following figures in which:

FIG. 1 illustrates an example of an image or video compression, transmission and decompression pipeline.

Figure 2:
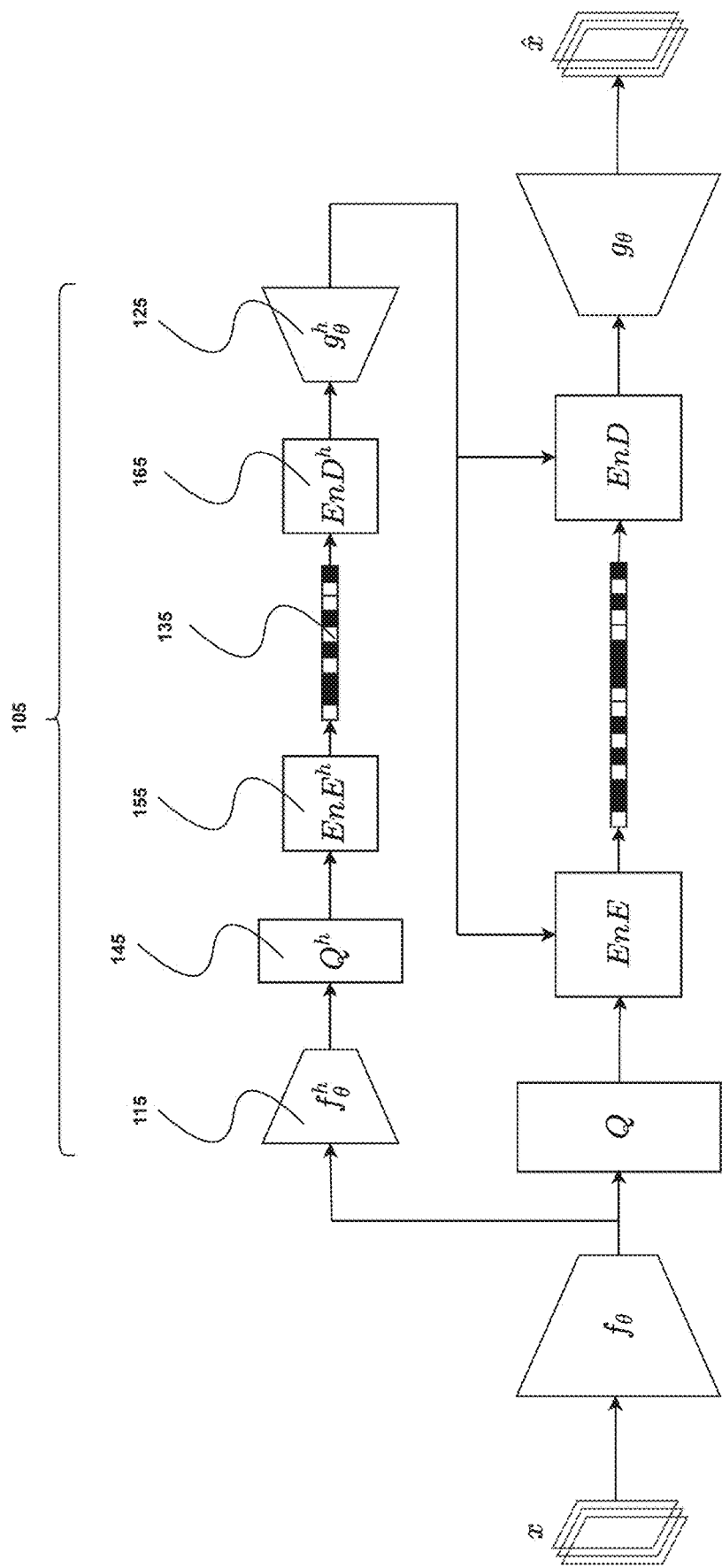
Figure 3:
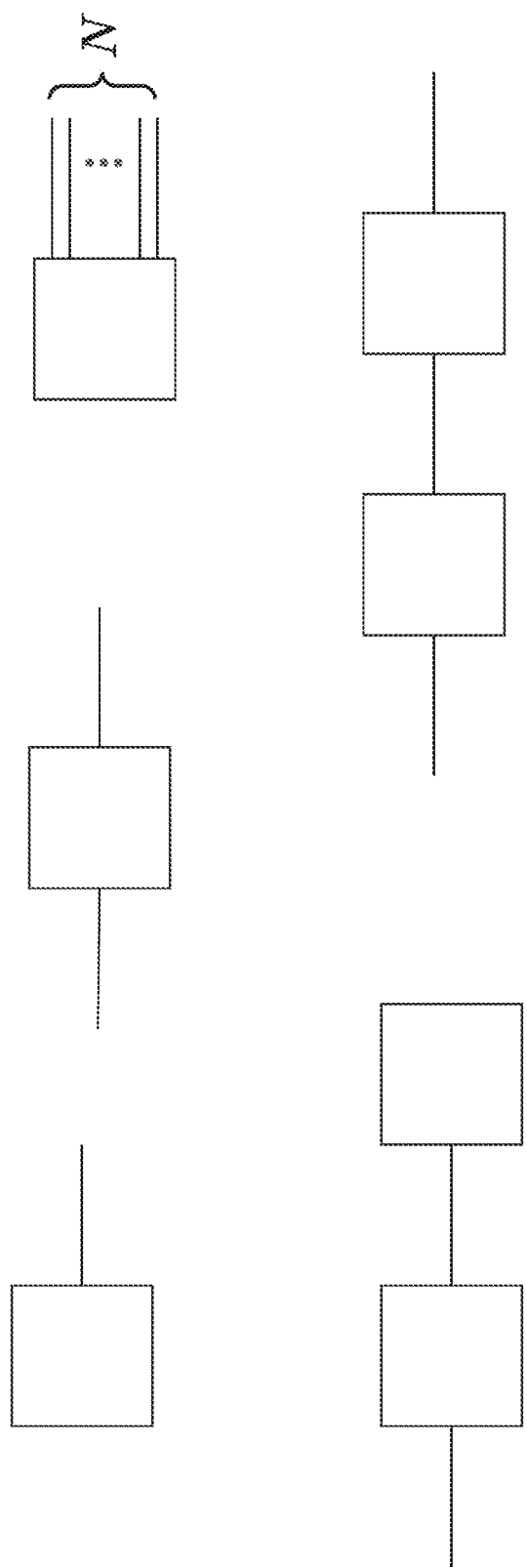
Figure 4:
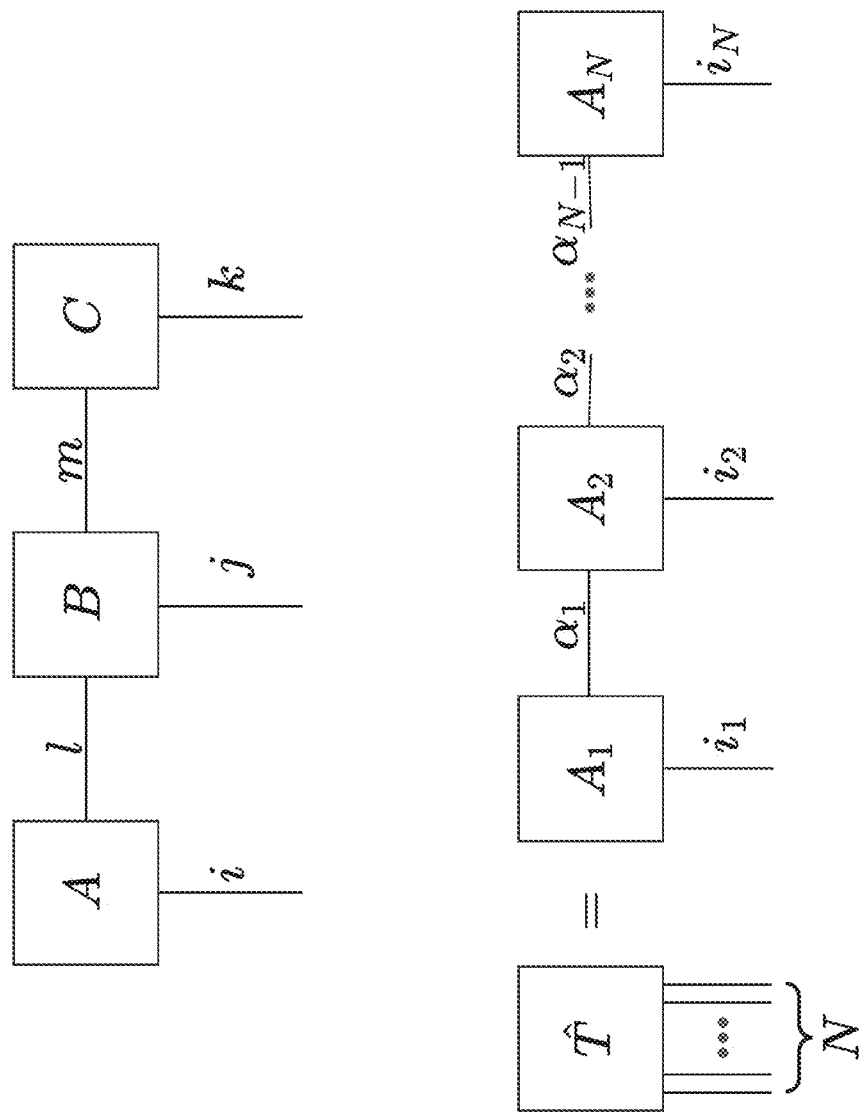
Figure 5:
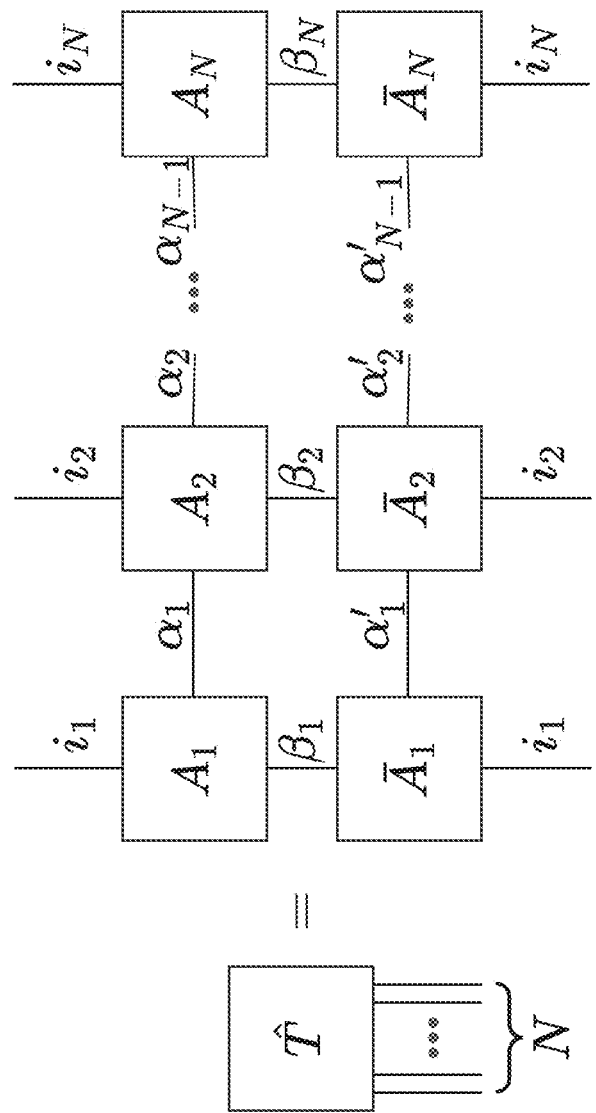
Figure 6:
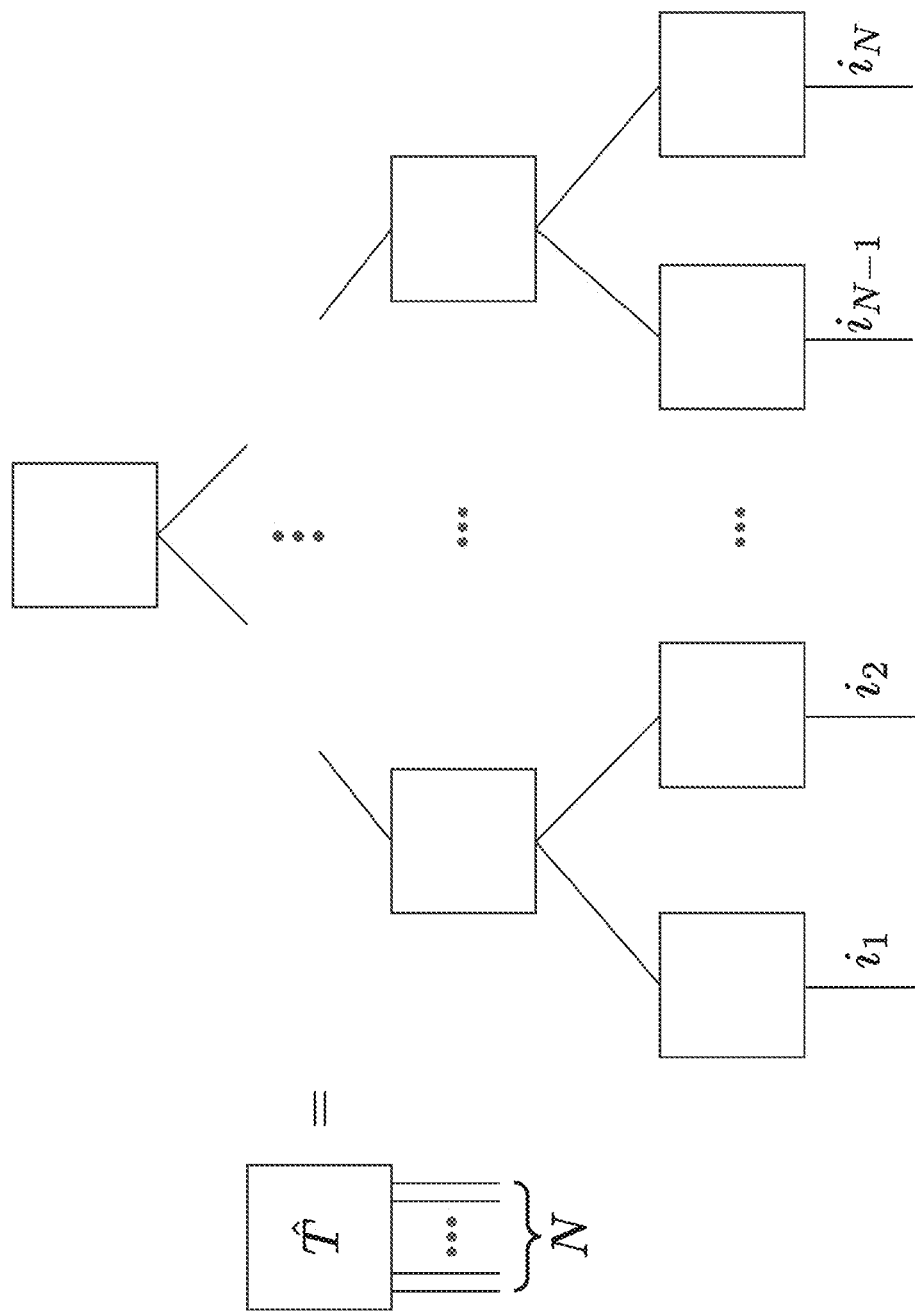
Figure 7:
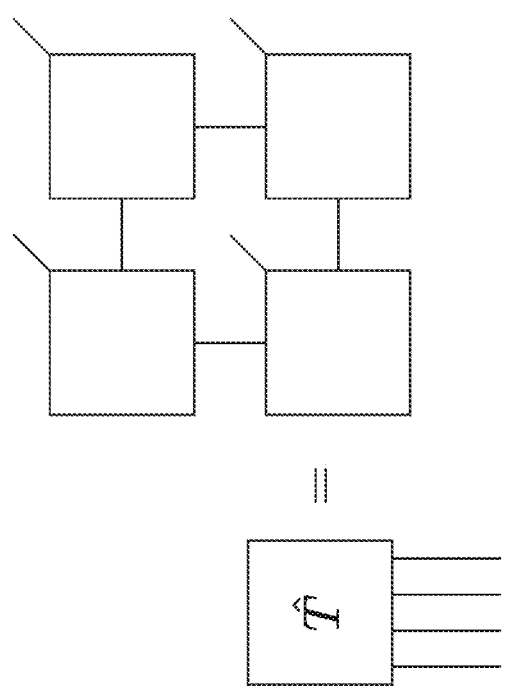
Figure 8:
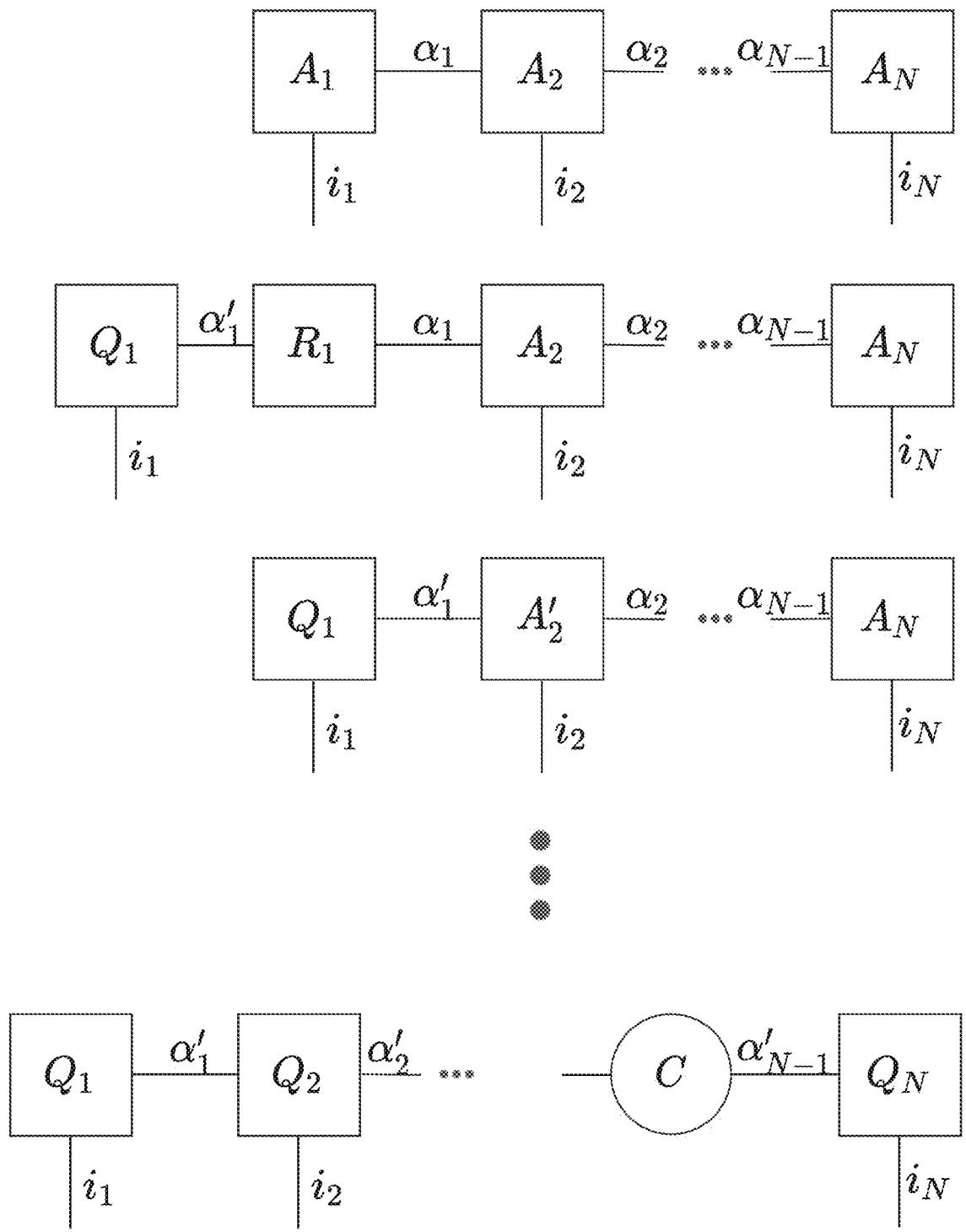
Figure 9:
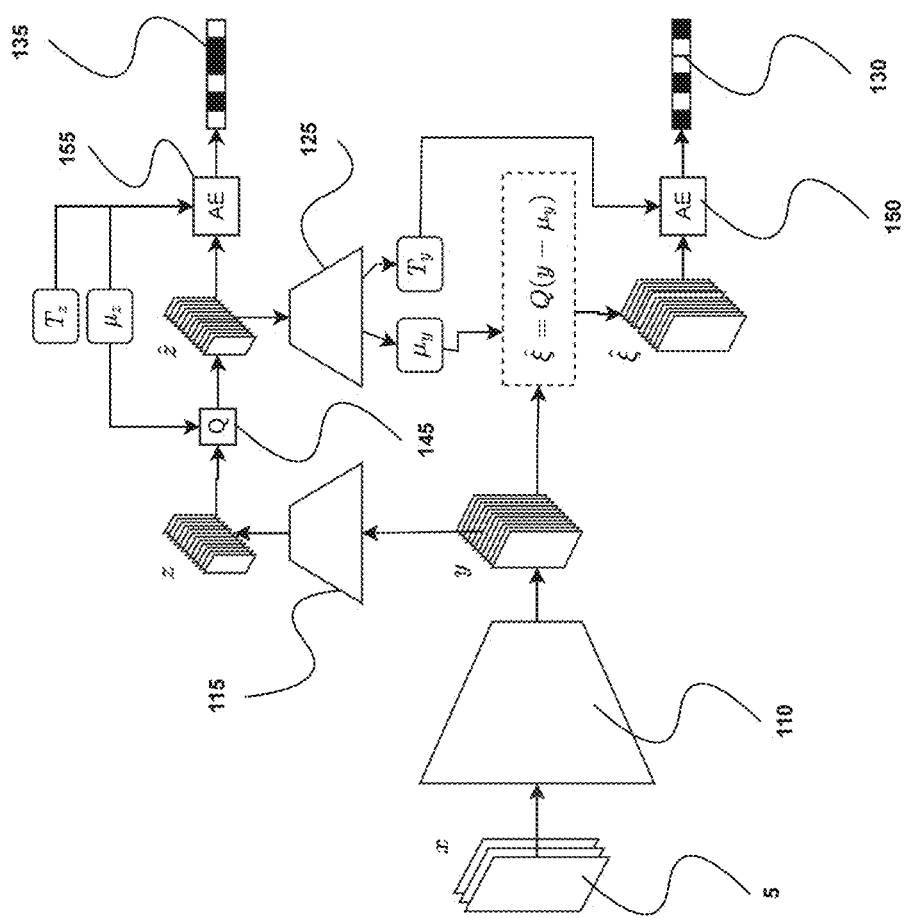
Figure 10:
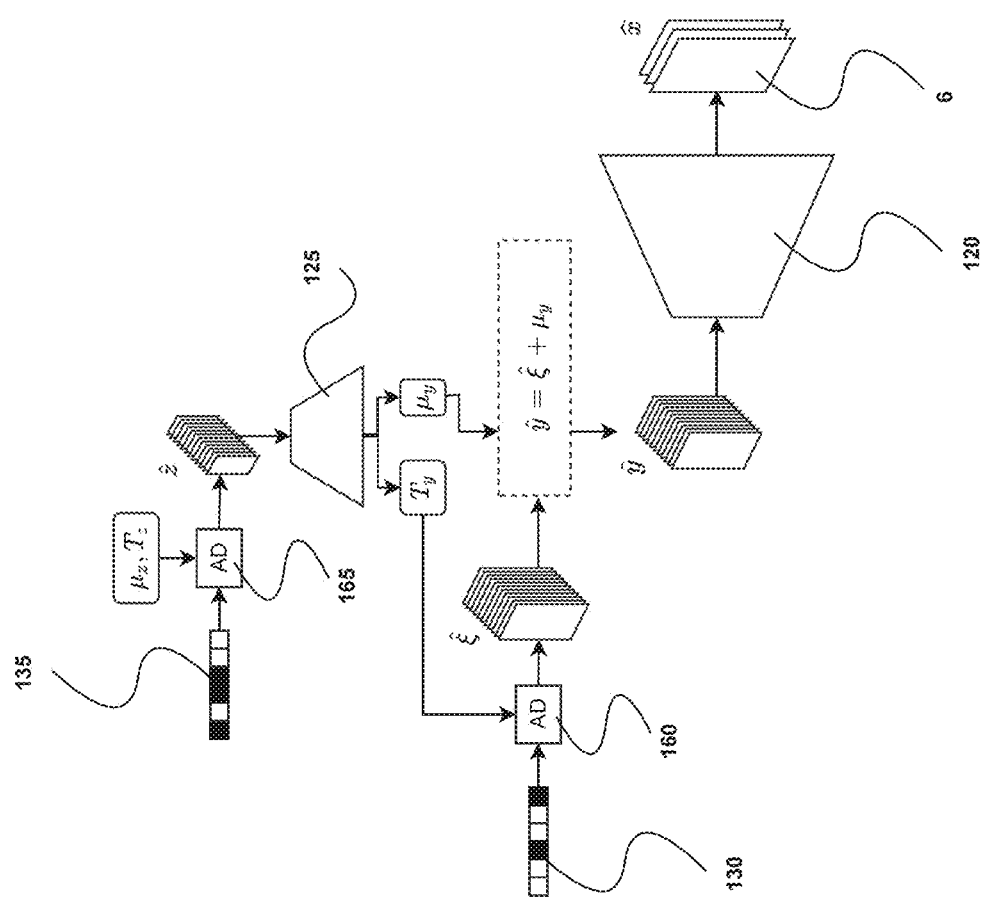

FIG. 2 illustrates a further example of an image or video compression, transmission and decompression pipeline including a hyper-network FIG. 3 illustrates various tensor and tensor products in diagrammatic notation FIG. 4 illustrates an example of a 3-tensor decomposition and a Matrix Product State in diagrammatic notation FIG. 5 illustrates an example of a Locally Purified State in diagrammatic notation FIG. 6 illustrates an example of a Tensor Tree in diagrammatic notation FIG. 7 illustrates an example of a 2×2 Projected Entangled Pair State in diagrammatic notation FIG. 8 illustrates an example of the procedure for transforming a Matrix Product State into canonical form in diagrammatic notation FIG. 9 illustrates an example of an image or video compression pipeline with a tensor network predicted by a hyper-encoder/hyper-decoder FIG. 10 illustrates an example of an image or video decompression pipeline with a tensor network predicted by a hyper-decoder Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression. JPEG, JPEG2000, AVC, HEVC and AVI are examples of compression processes for image and/or video files.

In a compression process involving an image, the input image may be represented as x. The data representing the image may be stored in a tensor of dimensions H×W×C, where H represents the height of the image, W represents the width of the image and C represents the number of channels of the image. Each H×W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB colour space, which may also be referred to as a model or a format. Other examples of colour spaces or formats include the CMKY and the YCbCr colour models. However, the channels of an image file are not limited to storing colour information and other information may be represented in the channels. As a video may be considered a series of images in sequence, any compression process that may be applied to an image may also be applied to a video. Each image making up a video may be referred to as a frame of the video.

The output image may differ from the input image and may be represented by $\hat{x}$. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, one or more of the values in the convolution matrix may be a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients dL/dy of the loss function. A plurality of neural networks in a system may be trained simultaneously through back-propagation of the gradient of the loss function to each network.

In the case of AI based image or video compression, the loss function may be defined by the rate distortion equation. The rate distortion equation may be represented by Loss=D+ $\lambda$*R, where D is the distortion function, $\lambda$ is a weighting factor, and R is the rate loss. $\lambda$ may be referred to as a lagrange multiplier. The langrange multiplier provides as weight for a particular term of the loss function in relation to each other term and can be used to control which terms of the loss function are favoured when training the network.

In the case of AI based image or video compression, a training set of input images may be used. An example training set of input images is the KODAK image set (for example at www.cs.albany.edu/xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

An example of an AI based compression process 100 is shown in FIG. 1. As a first step in the AI based compression process, an input image 5 is provided. The input image 5 is provided to a trained neural network 110 characterized by a function $f_\theta$ acting as an encoder. The encoder neural network 110 produces an output based on the input image. This output is referred to as a latent representation of the input image 5. In a second step, the latent representation is quantised in a quantisation process 140 characterised by the operation Q, resulting in a quantized latent. The quantisation process transforms the continuous latent representation into a discrete quantized latent. An example of a quantization process is a rounding function.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function go acting as a decoder, which decodes the quantized latent. The trained neural network 120 produces an output based on the quantized latent. The output may be the output image of the AI based compression process 100. The encoder-decoder system may be referred to as an autoencoder.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

The AI based compression process may further comprise a hyper-network 105 for the transmission of meta-information that improves the compression process. The hyper-network 105 comprises a trained neural network 115 acting as a hyper-encoder $f_\theta^h$ and a trained neural network 125 acting as a hyper-decoder $g_\theta^h$. An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterised by $Q^h$ to produce a quantized hyper-latent. The quantization process 145 characterised by $Q^h$ may be the same as the quantisation process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder may not be an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 2, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

Probabilistic modeling with tensor networks for usage in, but not limited to, AI-based image and video compression will now be discussed with respect to the above.

AI-based compression relies on modeling discrete probability mass functions (PMFs). These PMFs can appear deceptively simple. Our usual mental model begins with one discrete variable X, which can take on D possible values $X_1, \ldots, X_D$. Then, constructing a PMF P(X) is done simply by making a table where the entries are defined $P_i = P(X_i)$. Of course the $P_i$'s

| $X_1$ | $X_2$ | ... | $X_D$ |
|---|---|---|---|
| $P_1$ | $P_2$ | ... | $P_D$ | have to be non-negative and sum to 1, but this can be done by for example using the softmax function. For modeling purposes, it doesn't seem that hard to learn each of the $P_i$'s in this table that would fit a particular data distribution.

What about a PMF over two variables, X and Y, each of which can take on N possible values? This again still seems manageable, in that a 2d table would be needed, with entries $P_{ij} = P(X_i, Y_j)$ This is slightly more involved; now the table has $D^2$ entries, but still

|  | $Y_1$ | $Y_2$ | ... | $Y_D$ |
|---|---|---|---|---|
| $X_1$ | $P_{11}$ | $P_{12}$ | ... | $P_{1D}$ |
| ... |  |  |  |  |
| $X_D$ | $P_{D1}$ | $P_{D2}$ | ... | $P_{DD}$ | manageable, provided D is not too big. Continuing on, with three variables, a 3d table would be needed, where entries $P_{ijk}$ indexed by a 3-tuple.

However this naive "build a table" approach may quickly becomes unmanageable, as soon as we attempt to model any more than a handful of discrete variables. For example, think of modeling a PMF over the space of RGB 1024×1024 images: each can take on $256^3$ possible values (each color channel has 256 possible values, and we have 3 color channels). Then the lookup table we'd need has $256^{3 \cdot 1024^2}$ entries. In base 10 that's about $10^{10^7}$. There are many approaches to dealing with this problem and the textbook approach in discrete modeling is to use probabilistic graphical models.

In an alternative approach, PMFs may be modelled as tensors. A tensor is simply another word for a giant table (but with some extra algebraic properties, not discussed herein). A discrete PMF can always be described as a tensor. For example, a 2-tensor (alternatively referred to as a matrix) is an array with two indices, ie a 2d table. So the above PMF $P_{ij} = P(X_i, Y_j)$ over two discrete variables X and Y is a 2-tensor. An N-tensor $T_{i_1, \ldots, i_N}$ is an array with N indices, and if the entries of T are positive and sum to 1, this is a PMF over N discrete variables. Table 1 presents a comparison of the standard way of viewing PMFs with the tensorial viewpoint, for some probabilistic concepts.

TABLE 1

Comparison of several probabilistic concepts with a tensorial viewpoint

| Functional picture | Tensorial picture |
|---|---|
| Discrete function $P(X_1, \ldots, X_N)$ on N random variables | Tensor with N indices $T_{i_1, \ldots, i_N}$ |
| Each random variable takes on D possible values | Each index takes on D possible integer values: $i_j = 1, \ldots, D$ |
| Normalization: $1 = \Sigma_{i_1, \ldots, i_N} P(X_1 = x_{i_1}, \ldots, X_N = x_{i_N})$ | Normalization: $1 = \Sigma_{i_1, \ldots, i_N} T_{i_1, \ldots, i_N}$ |
| Marginalize over a random variable: $P(Y) = \Sigma_i P(X = x_i, Y)$ | Marginalize over a random variable: $T_j = \Sigma_i T_{ij}$ |
| Independent random variables: $P(X, Y) = P(X)P(Y)$ | $T_{ij}$ is rank 1: $T_{ij} = v \otimes w$ |

The main appeal of this viewpoint is that massive tensors may be modelled using the framework of tensor networks. Tensor networks may be used to approximate a very high dimensional tensor with contractions of several low dimensional (ie. tractable) tensors. That is, tensor networks may be used to perform a low-rank approximations of otherwise intractable tensors. For example, if we view matrices as 2-tensors, standard low-rank approximations (such as singular value decomposition (SVD) and principle component analysis (PCA)) are tensor network factorizations. Tensor networks are generalizations of the low-rank approximations used in linear algebra to multilinear maps. An example of the use of tensor networks in probabilistic modeling for machine learning is shown in in "Ivan Glasser, Ryan Sweke, Nicola Pancotti, Jens Eisert, and J Ignacio Cirac. Expressive power of tensor-network factorizations for probabilistic modeling, with applications from hidden markov models to quantum machine learning. arXiv preprint, arXiv: 1907.03741, 2019", which is hereby incorporated by reference. Tensor networks may be considered an alternative to a grapical model. There is a correspondence between tensor networks and graphical models: any probabilistic graphical model can be recast as a tensor network, however the reverse is not true. There exist tensor networks for joint density modelling that cannot be recast as probabilistic graphical models, yet have strong performance guarantees, and are computationally tractable. In many circumstances tensor networks are more expressive than traditional probabilistic graphical models like HMMs:

Given a fixed number of parameters, experimentally the tensor networks outperform HMMs.

Moreover, for a fixed low-rank approximation, the tensor networks may theoretically again outperform HMMs.

All other modeling assumptions being equal, tensor networks may be preferred over HMMs.

An intuitive explanation for this result is that probabilistic graphical factor the joint via their conditional probabilities, which are usually constrained to be positive by only considering exponential maps $p(X=x_i|Y) \propto \exp(-f(x_i))$. This amounts to modeling the joint as a Boltzmann/Gibbs distribution. This may in fact be a restrictive modeling assumption. A completely alternative approach offered by tensor networks is to model the joint as an inner product: $p(X) \propto \langle X, HX \rangle$ for some Hermitian positive (semi-)definite operator H. (This modeling approach is inspired by the Born rule of quantum systems.) The operator H can be written as a giant tensor (or tensor network). Crucially, the entries of H can be complex. It is not at all obvious how (or even if) this could be translated into a graphical model. It does however present a completely different modeling perspective, otherwise unavailable.

Let us illustrate what a tensor network decomposition is through a simple example. Suppose we have a large D×D matrix T (a 2-tensor), with entries $T_{ij}$, and we want to make a low-rank approximation of T—say a rank-r approximation, with r<D. One way to do this is to find an approximation $\hat{T}$, with entries $$\hat{T}_{ij} = \sum_k A_{ik} B_{kj} \quad (1)$$

In other words, we're saying $\hat{T}=AB$, where A is an D×r matrix and B is an r×D matrix. We have introduced a hidden dimension, shared between A and B, which is to be summed over. This can be quite useful in modeling: rather than dealing with a giant D×D matrix, if we set r very small, we can save on a large amount of computing time or power by going from $D^2$ parameters to 2Dr parameters. Moreover, in many modeling situations, r can be very small while still yielding a "good enough" approximation of T.

Let's now model a 3-tensor, following the same approach. Suppose we're given a D×D×D tensor T, with entries $T_{ijk}$. One way to approximate T is with the following decomposition $$\hat{T}_{ijk} = \sum_{l,m} A_{il} B_{jlm} C_{km} \quad (2)$$

Here A and C are low-rank matrices, and B is a low-rank 3-tensor. There are now two hidden dimensions to be summed over: one between A and B, and one between B and C. In tensor network parlance, these hidden dimensions may be called the bond dimension. Summing over a dimension may be called a contraction.

This example can be continued, approximating a 4-tensor as a product of lower dimensional tensors, but the indexing notation quickly becomes cumbersome to write down. Instead, we will use tensor network diagrams, a concise way of diagrammatically conveying the same calculations.

In a tensor network diagram, tensors are represented by blocks, and each indexing dimension is represented as an arm, as shown in FIG. 3. The dimensionality of the tensor is seen by simply counting the number of free (dangling) arms. The top row of FIG. 3 shows from left to right a vector, a matrix and an N-tensor. Tensor-products (summing/contracting along a particular index dimension) are represented by connecting two tensor arms together. We can see diagrammatically in FIG. 3 that the matrix-vector product on the bottom left has one dangling arm, and so the resulting product is a 1-tensor, ie. a vector, as we'd expect. Similarly the matrix-matrix product on the bottom right has two dangling arms, and so its result is a matrix, as we'd expect.

We can represent the tensor decomposition of the 3-tensor $\hat{T}$ given by equation (2) diagrammatically, as seen in the top row of FIG. 4, which is much simpler to comprehend than equation (2) Now suppose we want to access a particular element $\hat{T}_{ijk}$ of $\hat{T}$. We just fix the free indices to the desired values, and then perform the necessary contractions.

Armed with this notation, we can now delve into some possible tensor-network factorizations used for probabilistic modeling. The key idea is that the true joint distribution for a high-dimensional PMF is intractable. We must approximate it, and will do so using tensor-network factorizations. These tensor network factorizations can then be learned to fit training data. Not all tensor network factorizations will be appropriate. It may be necessary to constrain entries of the tensor network to be non-negative and to sum to 1.

An example if an approach is the use of a Matrix Product State (MPS) (sometimes also called a Tensor Train). Suppose we want to model a PMF $P(X_1, \ldots, X_N)$ as a tensor $\hat{T}_{i_1, \ldots, i_N}$. An MPS decomposes this tensor into a long chain of 2- and 3-tensors $$\hat{T}_{i_1, i_2, \ldots, i_N} = \sum_{\alpha_1, \ldots, \alpha_{N-1}} A_{1 i_1}^{\alpha_1} A_{2 i_2}^{\alpha_1, \alpha_2} \ldots A_{N i_N}^{\alpha_{N-1}} \quad (3)$$

Graphically as a tensor network diagram, this can be seen in the bottom row of FIG. 4. To ensure $\hat{T}$ only has positive entries, each of the constituent $A_j$ tensors is constrained to have only positive values. This could be done say by element-wise exponentiating a parameter matrix, A=exp(B).

To ensure the entries sum to 1, a normalization constant is computed by summing over all possible states. Though computing this normalization constant for a general N-tensor may be impractical, conveniently for an MPS, due to its linear nature, the normalization constant can be computed in O(N) time. Here by "linear nature" we mean, the tensor products can be performed sequentially one-by-one, operating down the line of the tensor train. (Both tensors and their tensor network approximations are multilinear functions.)

An MPS appears quite a lot like Hidden Markov Model (HMM). In fact, there is indeed a correspondence: An MPS with positive entries corresponds exactly to an HMM.

Further examples of tensor network models are Born Machines and Locally Purified States (LPS). Both are inspired by models arising in quantum systems. Quantum systems assume the Born rule, which says that the probability of an event X occurring is proportional to it's squared norm under an inner product $\langle \bullet, H \bullet \rangle$, with some positive (semi-)definite Hermitian operator H. In other words, the joint probability is a quadratic function. This is a powerful probabilistic modeling framework that has no obvious connection to graphical models.

Locally Purified State (LPS) takes the form depicted in FIG. 5 In an LPS, there is no constraint on the sign of the constituent $A_k$ tensors—they can be positive or negative. In fact, the $A_k$'s can have complex values. In this case, $\bar{A}$ is the tensor made of taking the complex conjugate of the entries in A. The $\alpha_k$ dimensions may be called bond dimensions, and the $\beta_k$ dimensions may be called purification dimensions.

The elements of $\hat{T}$ are guaranteed to be positive, by virtue of the fact that contraction along the purification dimension yields positive values (for a complex number z, $z\bar{z}>0$). If we view $\{i_1, \ldots, i_N\}$ as one giant multi-index I, we can see that the LPS is the diagonal of a giant matrix (after contracting all the hidden dimensions), and evaluating the LPS is equivalent to an inner product operating on the state space.

As in the MPS, computing the normalization constant of an LPS is fast and can be done in O(N) time. A Born Machine is a special case of LPS, when the size of the purification dimensions is one.

Tensor trees are another example type of tensor network. At the leaves of the tree, dangling arms are to be contracted with data. However, the hidden dimensions are arranged in a tree, where nodes of the tree store tensors. Edges of the tree are dimensions of the tensors to be contracted. A simple Tensor Tree is depicted in FIG. 6. Nodes of the tree store tensors and edges depict contractions between tensors. At the leaves of the tree are indices to be contracted with data. Tensor trees can be used for multi-resolution and/or multi-scale modeling of the probability distribution.

Note that a tensor tree can be combined with the framework of the Locally Purified State: a purification dimension could be added to each tensor node, to be contracted with the complex conjugate of that node. This would then define an inner product according to some Hermitian operator given by the tensor tree and it's complex conjugate.

Another example tensor network is the Projected Entangled Pair States (PEPS). In this tensor network, tensor nodes are arranged in a regular grid, and are contracted with their immediate neighbours. Each tensor has an additional dangling arm (free index) which is to be contracted with data (such as latent pixel values). In a certain sense, PEPS draws a similarity to Markov Random Fields and the Ising Model. A simple example of PEPS on a 2×2 image patch is given in FIG. 7.

Tensor network calculations (such as computing the joint probability of a PMF, conditional probabilities, marginal probabilities, or calculating the entropy of a PMF) can be massively simplified, and greatly sped up, by putting a tensor into canonical form, as discussed in greater detail below. All of the tensors networks discussed above can be placed into a canonical form.

Because the basis in which hidden dimensions are represented is not fixed (so called gauge-freedom), we can simply change the basis in which these tensors are represented. For example, when a tensor network is placed in canonical form, almost all the tensors can be transformed into orthonormal (unitary) matrices.

This can be done by performing a sequential set of decompositions on the tensors in the tensor network. These decompositions include the QR decomposition (and it's variants, RQ, QL, and LQ), the SVD decomposition, and the spectral decomposition (if it is available), the Schur decomposition, the QZ decomposition, Takagi's decomposition, among others. The procedure of writing a tensor network in canonical form works by decomposing each of the tensors into an orthonormal (unitary) component, and an other factor. The other factor is contracted with a neighbouring tensor, modifying the neighbouring tensor. Then, the same procedure is applied to the neighbouring tensor and it's neighbours, and so on, until all but one of the tensors is orthonormal (unitary).

The remaining tensor which is not orthonormal (unitary) may be called the core tensor. The core tensor is analagous to the diagonal matrix of singular values in an SVD decomposition, and contains spectral information about the tensor network. The core tensor can be uses to calculate for instance normalizing constants of the tensor network, or the entropy of the tensor network.

FIG. 8 shows, from top to bottom, an example of the procedure for transforming a MPS into canonical form. Sequentially core tensors are decomposed via a QR decomposition. The R tensor is contracting with the next tensor in the chain. The procedure is repeated until all but a core tensor C is in an orthonormal form.

The use of tensor networks for probabilistic modeling in AI-based image and video compression will now be discussed in more detail. As discussed above, in an AI-based compression pipeline, an input image (or video) x is mapped to a latent variable y, via an encoding function (typically a neural network). The latent variable y is quantized to integer values $\hat{y}$, using a quantization function Q. These quantized latents are converted to a bitstream using a lossless encoding method such as entropy encoding as discussed above. Arithmetic encoding or decoding is an example of such an encoding process and will be used as an example in further discussion. This lossless encoding process is where the probabilistic model is required: the arithmetic encoder/decoder requires a probability mass function $q(\hat{y})$ to convert integer values into the bitstream. On decode, similarly the PMF is used to turn the bitstream back into quantized latents, which are then fed through a decoder function (also typically a neural network), which returns the reconstructed image $\hat{x}$.

The size of the bitstream (the compression rate) is determined largely by the quality of the probability (entropy) model. A better, more powerful, probability model results in smaller bitstreams for the same quality of reconstructed image.

The arithmetic encoder typically operates on one-dimensional PMFs. To incorporate this modeling constraint, typically the joint PMF $q(\hat{y})$ is assumed to be independent, so that each of the pixels $\hat{y}^i$ is modeled by a one-dimensional probability distribution $q(\hat{y}^i|\theta^i)$. Then the joint density is modeled as $$q(\hat{y}) = \prod_{i=1}^{M} q(\hat{y}^i | \theta^i) \qquad (4)$$

where M is the number of pixels. The parameters $\theta_i$ control the one-dimensional distribution at pixel i. As discussed above, often the parameters $\theta$ may be predicted by a hyper-network (containing a hyper-encoder and hyper-decoder). Alternately or additionally, the parameters may be predicted by a context-model, which uses previously decoded pixels as an input.

Either way, fundamentally this modeling approach assumes a one-dimensional distribution on each of the $\hat{y}^i$ pixels. This may be restrictive. A superior approach can be to model the joint distribution entirely. Then, when encoding or decoding the bitstream, the necessary one-dimensional distributions needed for the arithmetic encoder/decoder can be computed as conditional probabilities.

Tensor networks may be used for modeling the joint distribution. This can be done as follows. Suppose we are given a quantized latent $\hat{y}=\{\hat{y}^1, \hat{y}^2, \ldots, \hat{y}^M\}$. Each latent pixel will be embedded (or lifted) into a high dimensional space. In this high dimensional space, integers are represented by vectors lying on the vertex of a probability simplex. For example, suppose we quantize $y^i$ to D possible integer values $\{-D//2, -D//2+1, \ldots, 1, 0, 1, \ldots, D//2-1, D//2\}$. The embedding maps $\hat{y}^i$ to a D-dimensional one-hot vector, with a one in the slot corresponding to the integer value, and zeros everywhere else.

For example, suppose each $\hat{y}^i$ can take on values $\{-3, -2, -1, 0, 1, 2, 3\}$, and $\hat{y}^i=-1$. Then the embedding is $e(\hat{y}^i)=(0, 0, 1, 0, 0, 0, 0)$.

Thus, the embedding maps $\hat{y}=\{\hat{y}^1, \hat{y}^2, \ldots, \hat{y}^M\}$ to $e(\hat{y})=\{e(\hat{y}^1), e(\hat{y}^2), \ldots, e(\hat{y}^M)\}$. In effect this takes $\hat{y}$ living in a M-dimensional space, and maps it to a $D^M$ dimensional space.

Now, each of these entries in the embedding can be viewed as dimensions indexing a high-dimensional tensor. Thus, the approach we will take is model the joint probability density via a tensor network $\hat{T}$. For example, we could model the joint density as $$q(\hat{y}) = \langle e(\hat{y}), He(\hat{y}) \rangle \quad (5)$$

where H is a Hermitian operator modeled via a tensor network (as described above. Really any tensor network with tractable inference can be used here, such as Tensor Trees, Locally Purified States, Born Machines, Matrix Product States, or Projected Entangled Pair States, or any other tensor network.

At encode/decode, the joint probability cannot be used by the arithmetic encoder/decoder. Instead, one-dimensional distributions must be used. To calculate the one-dimensional distribution, conditional probabilities may be used.

Conveniently, conditional probabilities are easily computed by marginalizing out hidden variables, fixing prior conditional variables, and normalizing. All of these can be done tractably using tensor networks.

For example, suppose we encode/decode in raster-scan order. Then, pixel-by-pixel, we will need the following conditional probabilities: $q(\hat{y}^1)$, $q(\hat{y}^2|y^1)$, . . . , $q(\hat{y}^M|\hat{y}^{M-1}, \ldots, \hat{y}^1)$. Each of these conditional probabilities can be computed tractably by contracting the tensor network over the hidden (unseen) variables, fixing the index of the conditioning variable, and normalizing by an appropriate normalization constant.

If the tensor network is in canonical form, this is an especially fast procedure, for in this case contraction along the hidden dimension is equivalent to multiplication with the identity. The tensor network can be applied to joint probabilistic modeling of the PMF across all latent pixels, or patches of latent pixels, or modeling joint probabilities across channels of the latent representation, or any combination thereof.

Joint probabilistic modeling with a tensor network can be readily incorporated into an AI-based compression pipeline, as follows. The tensor network could be learned during end-to-end training, and then fixed post-training. Alternately, the tensor network, or components thereof, could be predicted by a hyper-network. A tensor network may additionally or alternatively be used for entropy encoding and decoding the hyper-latent in the hyper network. In this case, the parameter of the tensor network used for entropy encoding and decoding the hyper-latent could be learned during end-to-end training, and then fixed post-training.

For instance, a hyper-network could predict the core tensor of a tensor network, on a patch-by-patch basis. In this scenario, the core tensor varies across pixel-patches, but the remaining tensors are learned and fixed across pixel patches. For example, see FIG. 9 showing a AI-based compression encoder with a Tensor Network predicted by a hyper-encoder/hyper-decoder and FIG. 10 showing an AI-based compression decoder with a Tensor Network predicted by a hyper-decoder for the use of a tensor network in an AI-based compression pipeline. Corresponding features to those shown in FIGS. 1 and 2 may be assumed to be the same as discussed above. In these example, it is the residual $\xi=y-\mu$ which is quantized, encoded, and decoded, using the tensor network probability model. The tensor network parameters are represented by $T_y$ in this case. In the example shown in FIGS. 9 and 10, the quantized hyperlatent $\hat{z}$ is additionally encoded and decoded using a tensor network probability model with parameters represented by $T_z$.

Rather than (or possibly in conjunction with) using a hyper-network to predict tensor network components, parts of the tensor network may be predicted using a context module which uses previously decoded latent pixels.

During training of the AI-based compression pipeline with a tensor network probability model, the tensor network can be trained on non-integer valued latents (y rather than $\hat{y}=Q(y)$, where Q is a quantization function). To do so, the embedding functions e can be defined on non-integer values. For example, the embedding function could comprise of tent functions, which take on the value of 1 at the appropriate integer value, zero at all other integers, and linearly interpolating between. This then performs multi-linear interpolation. Any other real-valued extension to the embedding scheme could be used, so long as the extension agrees with original embedding on integer valued points.

The performance of the tensor network entropy model may be enhanced by some forms of regularization during training. For example, entropy regularization could be used. In this case, the entropy H(q) of the tensor network could be calculated, and a multiple of this could be added or subtracted to the training loss function. Note that the entropy of a tensor network in canonical form can be easily calculated by computing the entropy of the core tensor.

The invention claimed is:

1. A method for lossy image or video encoding, transmission and decoding, the method comprising the steps of:
   receiving an input image at a first computer system;
   encoding the first input training image using a first trained neural network to produce a latent representation;
   performing a quantization process on the latent representation to produce a quantized latent;
   entropy encoding the quantized latent using a probability distribution, wherein the probability distribution is defined using a tensor network;
   transmitting the entropy encoded quantized latent to a second computer system;
   entropy decoding the entropy encoded quantized latent using the probability distribution to retrieve the quantized latent; and decoding the quantized latent using a second trained neural network to produce an output image, wherein the output image is an approximation of the input training image.

2. The method of claim 1, wherein the probability distribution is defined by a Hermitian operator operating on the quantized latent, wherein the Hermitian operator is defined by the tensor network.

3. The method of claim 1, wherein the tensor network comprises a non-orthonormal core tensor and one or more orthonormal tensors.

4. The method of claim 1, further comprising the steps of:
encoding the latent representation using a third trained neural network to produce a hyper-latent representation;
performing a quantization process on the hyper-latent representation to produce a quantized hyper-latent;
transmitting the quantized hyper-latent to the second computer system; and
decoding the quantized hyper-latent using a fourth trained neural network;
wherein the output of the fourth trained neural network is one or more parameters of the tensor network.

5. The method of claim 4 wherein the tensor network comprises a non-orthonormal core tensor and one or more orthonormal tensors; and
the output of the fourth trained neural network is one or more parameters of the non-orthonormal core tensor.

6. The method of claim 1, wherein one or more parameters of the tensor network are calculated using one or more pixels of the latent representation.

7. The method of claim 1, wherein the probability distribution is associated with a sub-set of the pixels of the latent representation.

8. The method of claim 1, wherein the probability distribution is associated with a channel of the latent representation.

9. The method of claim 1, wherein the tensor network is at least one of the following factorisations: Tensor Tree, Locally Purified State, Born Machine, Matrix Product State and Projected Entangled Pair State.

10. A method of training one or more networks, the one or more networks being for use in lossy image or video encoding, transmission and decoding, the method comprising the steps of:

receiving a first input training image;
encoding the first input training image using a first neural network to produce a latent representation;
performing a quantization process on the latent representation to produce a quantized latent;
entropy encoding the quantized latent using a probability distribution, wherein the probability distribution is defined using a tensor network;
entropy decoding the entropy encoded quantized latent using the probability distribution to retrieve the quantized latent;
decoding the quantized latent using a second neural network to produce an output image, wherein the output image is an approximation of the input training image;
evaluating a loss function based on differences between the output image and the input training image;
evaluating a gradient of the loss function;
back-propagating the gradient of the loss function through the first neural network and the second neural network to update the parameters of the first neural network and the second neural network; and
repeating the above steps using a first set of training images to produce a first trained neural network and a second trained neural network.

11. The method of claim 10, wherein one or more of the parameters of the tensor network is additionally updated based on back-propogation of the loss function.

12. The method of claim 10, wherein the tensor network comprises a non-orthonormal core tensor and one or more orthonormal tensors; and
the parameters of all of the tensors of the tensor network except for the non-orthonormal core tensor are updated based on back-propogation of the loss function.

13. The method of claim 10, wherein the tensor network is calculated using the latent representation.

14. The method of claim 13, wherein the tensor network is calculated based on a linear interpolation of the latent representation.

15. The method of claim 10, wherein the loss function further comprises a term based on the entropy of the tensor network.

16. A data processing system configured to perform the method of claim 1.

* * * * *